United States Patent
Hastings

(10) Patent No.: US 9,424,480 B2
(45) Date of Patent: Aug. 23, 2016

(54) OBJECT IDENTIFICATION USING OPTICAL CODE READING AND OBJECT RECOGNITION

(71) Applicant: Datalogic ADC, Inc., Eugene, OR (US)

(72) Inventor: Robert D. Hastings, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 327 days.

(21) Appl. No.: 13/831,025

(22) Filed: Mar. 14, 2013

(65) Prior Publication Data

US 2013/0279748 A1    Oct. 24, 2013

Related U.S. Application Data

(60) Provisional application No. 61/636,538, filed on Apr. 20, 2012.

(51) Int. Cl.
*G06K 9/46* (2006.01)
*G06K 9/72* (2006.01)

(52) U.S. Cl.
CPC .. *G06K 9/46* (2013.01); *G06K 9/72* (2013.01); *G06K 2209/27* (2013.01)

(58) Field of Classification Search
None
See application file for complete search history.

(56) References Cited

U.S. PATENT DOCUMENTS

| | | |
|---|---|---|
| 4,000,397 A | 12/1976 | Hebert et al. |
| 4,963,719 A | 10/1990 | Brooks et al. |
| 5,128,527 A | 7/1992 | Kawai et al. |
| 5,198,649 A | 3/1993 | Brooks |
| 5,296,690 A | 3/1994 | Chandler et al. |
| 5,311,000 A | 5/1994 | Brooks |
| 5,440,110 A | 8/1995 | Brooks |
| 5,446,271 A | 8/1995 | Cherry et al. |
| 5,493,108 A | 2/1996 | Cherry et al. |
| 5,929,421 A | 7/1999 | Cherry et al. |
| 6,069,696 A | 5/2000 | McQueen et al. |
| 6,097,839 A | 8/2000 | Liu |
| 6,152,368 A | 11/2000 | Olmstead et al. |
| 6,158,660 A | 12/2000 | Blanford et al. |

(Continued)

FOREIGN PATENT DOCUMENTS

| | | |
|---|---|---|
| KR | 10-2005-0102306 A | 10/2005 |
| KR | 10-2007-0036491 A | 4/2007 |

OTHER PUBLICATIONS

Louka Dlagnekov NPL (Video-Based Car Surveillance: License Plate, Make, and Model Recognition, University of CA, San Diego, p. 1-93, 2005).*

(Continued)

*Primary Examiner* — Bhavesh Mehta
*Assistant Examiner* — Oneal R Mistry
(74) *Attorney, Agent, or Firm* — Stoel Rives LLP; Robert R. Teel

(57) ABSTRACT

An object identification system comprises an optical code reader that scans an optical code of an object and decodes a portion of the optical code. Using the decoded portion of the optical code, a database filter unit generates a filtered subset of feature models from a set of feature models of known objects stored in a database. An image capture device captures an image of the object, and a feature detector unit detects visual features in the image. A comparison unit compares the detected visual features to the filtered subset of feature models to identify a match between the object and a known object.

18 Claims, 5 Drawing Sheets

(56) References Cited

U.S. PATENT DOCUMENTS

| | | |
|---|---|---|
| 6,366,696 B1 | 4/2002 | Hertz et al. |
| 6,729,603 B1 | 5/2004 | McQueen et al. |
| 7,246,747 B2 | 7/2007 | Bremer et al. |
| 7,387,251 B2 | 6/2008 | Baker et al. |
| 7,883,012 B2 | 2/2011 | Tabet et al. |
| 7,909,248 B1 * | 3/2011 | Goncalves ............ G07G 1/0063 235/375 |
| 2004/0118920 A1 * | 6/2004 | He ...................... G06K 7/0004 235/454 |
| 2006/0261157 A1 | 11/2006 | Ostrowski et al. |
| 2009/0060259 A1 | 3/2009 | Goncalves |
| 2010/0059589 A1 | 3/2010 | Goncalves et al. |
| 2010/0217678 A1 | 8/2010 | Goncalves |
| 2011/0068173 A1 * | 3/2011 | Powers et al. ............ 235/462.06 |
| 2011/0121077 A1 | 5/2011 | Joseph et al. |
| 2011/0286628 A1 | 11/2011 | Goncalves et al. |
| 2012/0128251 A1 * | 5/2012 | Petrou et al. .................. 382/182 |

OTHER PUBLICATIONS

International Searching Authority, "International Search Report and Written Opinion," PCT/US2013/035116, Jul. 26, 2013.

* cited by examiner

OBJECT IDENTIFICATION USING OPTICAL CODE READING AND OBJECT RECOGNITION

RELATED APPLICATIONS

This application claims priority benefit under 35 U.S.C. §119(e) of U.S. Provisional Patent Application No. 61/636,538, filed Apr. 20, 2012, which is incorporated herein by reference in its entirety.

BACKGROUND

The field of this disclosure relates generally to systems and methods of identifying objects, and more particularly, but not exclusively, to data reading (e.g., reading optical codes) and object recognition.

Various approaches have been used to identify objects, such as items or merchandise, in retail applications. One approach involves the use of optical codes that encode useful, optically-readable information about the objects to which they are attached or otherwise associated. An optical code is essentially a machine-readable representation of information in a visual format. Some optical codes use a dark ink on a white substrate to create high and low reflectance upon scanning or reading of the optical code. For the purposes of the present description, the terms scanning and reading may be used interchangeably to connote acquiring data associated with an optical code. Likewise, optical code scanners and optical code readers may be used interchangeably to connote devices used to acquire (e.g., scan or read) data associated with an optical code.

Optical codes have various symbologies, such as UPC, Code 39, Code 128, and PDF417, that encode information data characters (or codewords as in the case of PDF417) and optional overhead characters according to a particular sequence of bars and spaces that may have varying widths. Perhaps the best example of an optical code is the barcode. Barcodes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a barcode typically serves as an identifier of an object, whether the identification be to a class of objects (e.g., containers of milk) or a unique item.

Various types of optical code readers, such as manual readers, semi-automatic readers, and automated readers, are available to decode the information encoded in optical codes. In a manual reader (e.g., a hand-held type reader, a fixed-position reader), a human operator positions a target object relative to the reader to read the optical code associated with the target object. In a semi-automatic reader, either checker-assisted or self-checkout, objects are moved usually one at a time by the user into or through a read zone of the reader and the reader then reads the optical code on the object. In an automated reader (e.g., a tunnel scanner, a portal scanner), the target object is automatically positioned (e.g., via a conveyor) relative to the reader to read the optical code on the target object. In manual, semi-automatic, and automated readers, an error (e.g., a no-code exception) may occur when the reader attempts to decode the optical code on the target object. For example, the reader may be unsuccessful in decoding the entire optical code of the target object because part of the optical code is blocked or otherwise obscured from the view of the reader. When such an error occurs, an operator may have to manually enter (e.g., via a keyboard) an identification number (e.g., a UPC number) or description of the target object to account for it in a transaction.

Another approach to identifying objects implements visual object recognition. Prior to recognizing a target object in a typical visual object recognition system, a database is built that includes visual features extracted from a plurality of known objects that one wants to recognize. To recognize the target object, sets of features are extracted from an image of the target object and the database is searched for the most similar feature to each feature in the set of extracted features (called a nearest neighbor). The nearest-neighbor matches from the database identify the known object to which the target object corresponds.

SUMMARY

In some embodiments, a method reduces a search space of a database including feature models used in visual object recognition. For example, the method includes obtaining an item-filter parameter corresponding to information encoded in a fragment of an optical code of an unknown item, in which the optical code fragment information is less than all the information encoded in a complete optical code; and determining a subset of feature models based on the item-filter parameter, wherein feature models of the subset correspond to a known item having known optical code information that includes the optical code fragment information encoded in the optical code of the unknown item.

In another embodiment, a method identifies an object having an optical code using a system that includes a database containing a set of feature models of known objects that have known optical code information associated therewith. For example, the method includes attempting to read the optical code; decoding a portion of the optical code; generating a filtered subset of feature models from the set of feature models based on the decoded portion of the optical code, each feature model of the filtered subset of feature models corresponding to a known object whose associated known optical code information includes a representation of the decoded portion of the optical code; capturing image data representing the object; extracting visual features from the image; and comparing the extracted visual features to the feature models of the filtered subset of feature models to identify a match between the object and a known object.

In some embodiments, an object identification system includes an optical code reader configured to attempt to decode a portion of the optical code; an image capture device configured to capture an image of the object; a feature detector unit configured to detect visual features in the image captured by the image capture device; a database configured to store feature models of a set of known objects that have known optical code information associated therewith; a database filter unit in communication with the optical code reader and the database, the database filter unit configured to, in response to the optical code reader decoding the portion of the optical code, receive a representation of the decoded portion of the optical code and generate a filtered subset of feature models based on the representation of the decoded portion of the optical code; and a comparison unit in communication with the feature detector unit and the database filter unit, the comparison unit configured to receive and compare the detected visual features and the feature models of the filtered subset of feature models to thereby identify a match between the object and a known object.

Additional aspects and advantages will be apparent from the following detailed description of embodiments, which proceeds with reference to the accompanying drawings.

BRIEF DESCRIPTION OF THE DRAWINGS

Understanding that drawings depict only certain embodiments and are not therefore to be considered to be limiting in nature, the embodiments will be described and explained with additional specificity and detail through the use of the accompanying drawings.

DETAILED DESCRIPTION OF EMBODIMENTS

With reference to the above-listed drawings, this section describes particular embodiments and their detailed construction and operation. The embodiments described herein are set forth by way of illustration only and not limitation. Skilled persons will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments.

As skilled persons will appreciate in light of this disclosure, certain embodiments are capable of achieving certain advantages over the known prior art, including some or all of the following: (1) automatically resolving no-code exceptions, (2) increasing the speed and/or accuracy of object recognition systems, (3) utilizing decoded portions of non-decoded optical codes in a feed-forward manner to improve object recognition performance, and (4) enabling practical implementation of an object recognition system that is capable of recognizing a relatively large number of known objects. The present inventors have also recognized a difficulty with typical visual object recognition systems in that as the database increases in size (i.e., as the number of known objects desired to be recognized increases), it becomes increasingly difficult and inefficient to search through a search space of the entire database contents to find the nearest-neighbors. For example, in some applications it may be desirable to recognize thousands, tens of thousands, hundreds of thousands, or even millions of objects. These and other advantages of various embodiments will be apparent upon reading the remainder of this section.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

Figure 1:
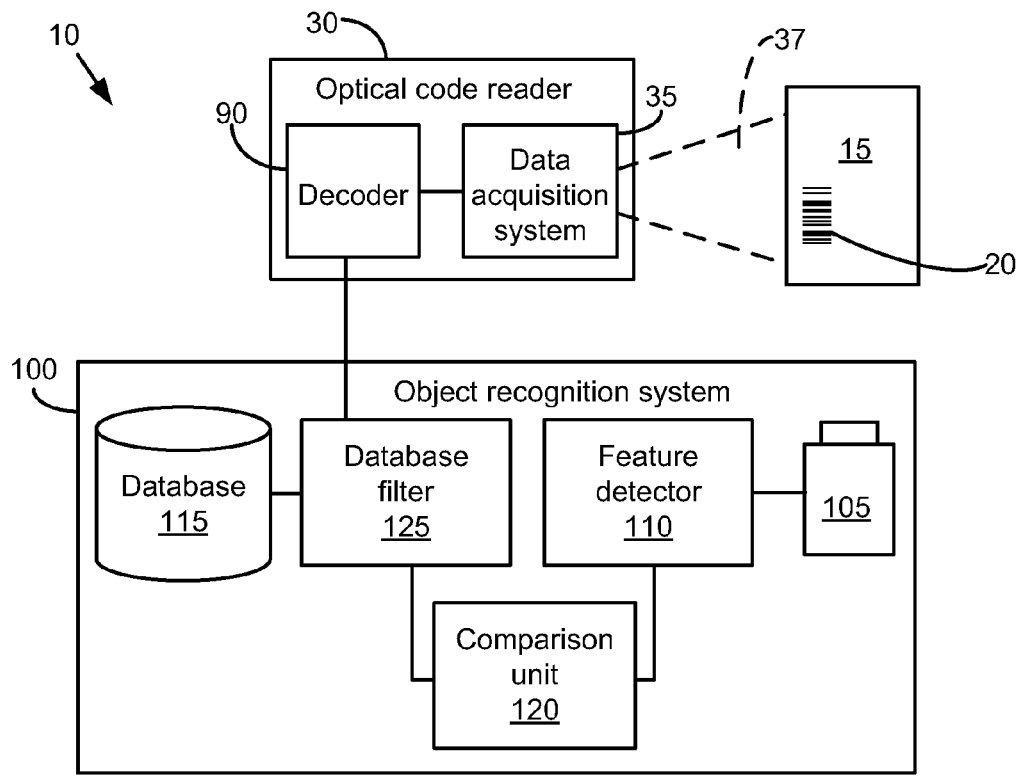
FIG. 1 is a block diagram of an object identification system according to one embodiment.
Figure 2:
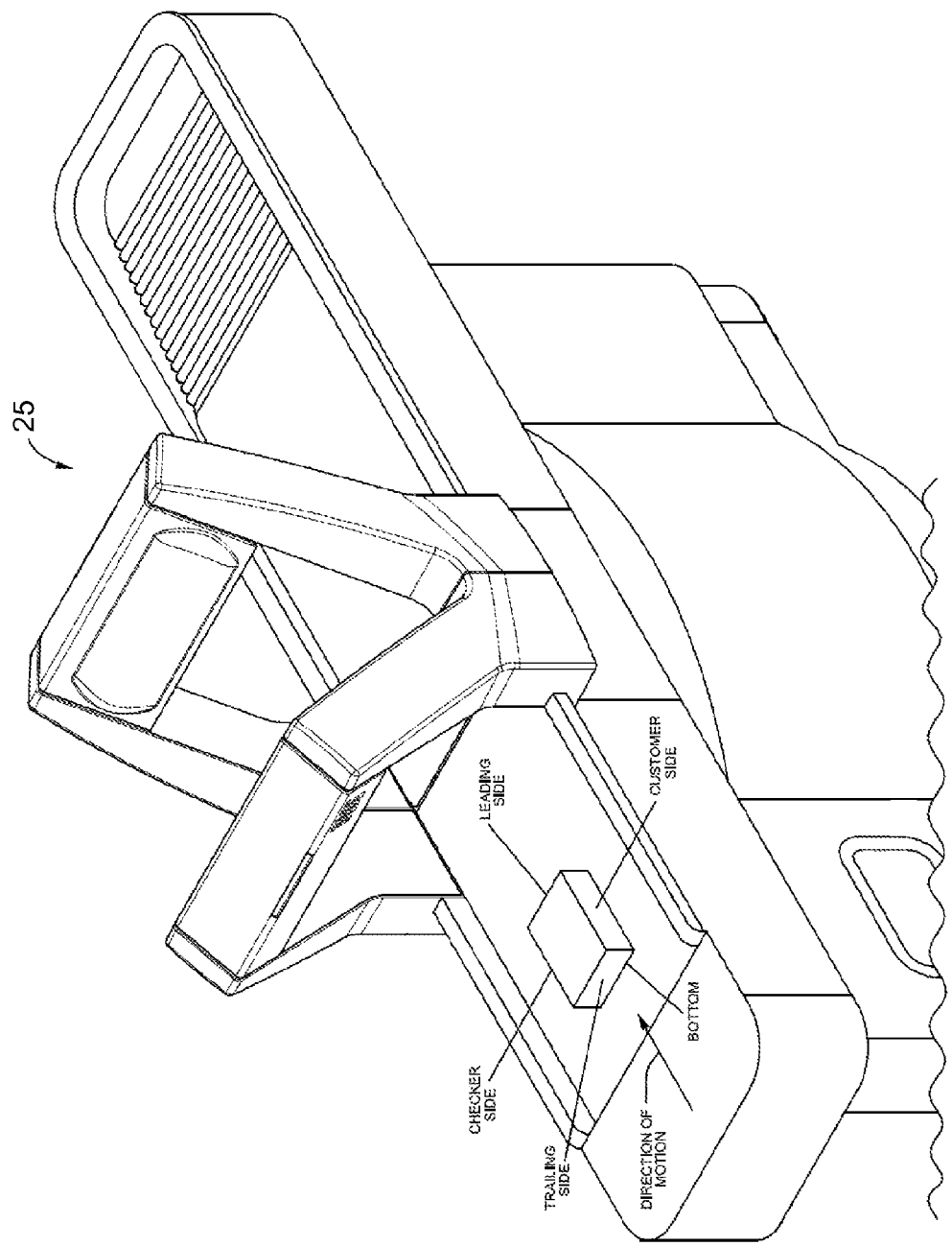
FIG. 2 is an isometric view of a checkstand, according to one embodiment, in which the object identification system of FIG. 1 may be implemented.

FIG. 1 is a block diagram of an object identification system 10 that is configured to identify an object 15 bearing an optical code 20. The system 10 may be used in various different applications. In one example, the system 10 is used in a checkstand at a high-volume retail establishment such as a grocery store or big-box store. One suitable example of a checkstand is shown in FIG. 2, which shows an automated checkout system 25. An example of an automated checkout system 25 is described in detail in U.S. application Ser. No. 13/357,356 and U.S. application Ser. No. 13/357,459.

Figures 3, 4:
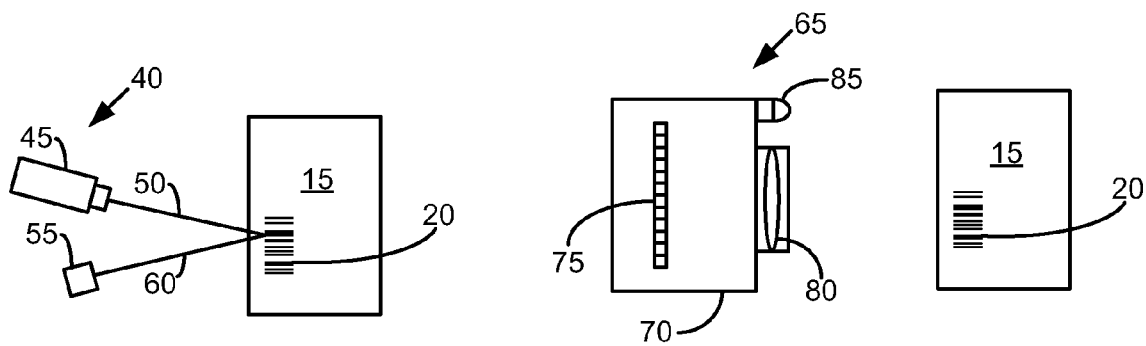
FIG. 3 is a diagram of a flying-spot type scanner that may be used in the object identification system of FIG. 1.
FIG. 4 is a diagram of an imager-based data reader that may be used in the object identification system of FIG. 1.

As shown in FIG. 1, the system 10 includes an optical code reader 30 that includes a data acquisition subsystem 35 configured to scan (read) the optical code 20 and acquire data from it when the optical code 20 is in a read zone 37 of the optical code reader 30. The optical code reader 30 may be any type of optical code reader including a manual reader, a semi-automatic reader, or an automated type reader. Furthermore, the optical code reader 30 may implement various types of data acquisition technologies. For example, the data acquisition subsystem 35 may correspond to a flying spot scanner 40 (e.g., a laser scanner) as shown in FIG. 3. In general, the flying spot scanner 40 includes (a) an illumination source 45 configured to produce an illumination beam 50 that is moved (e.g., scanned) across the optical code 20 and (b) a photodetector 55 that is configured to monitor reflected or backscattered light 60. In another example shown in FIG. 4, the data acquisition subsystem 35 may correspond to an imager-based system 65 that employs an image capture device 70 (e.g., a camera) to capture an image of the optical code 20. In general, the image capture device 70 includes an imager 75 (e.g., a 1D imager, a 2D imager) and light directing optics 80 to focus an image of the optical code 20 on the imager 75. The image capture device 70 may use ambient light or may include a light source 85 to illuminate the optical code 20. The imager 75 may be a monochrome imager or a color imager. Moreover, imager 75 may be any suitable imaging device such as, for example, a charge-coupled device (CCD) or a complementary metal oxide semiconductor (CMOS) imager.

The data acquisition subsystem 35 is configured to produce optical code data in response to reading the optical code 20. The data acquisition subsystem 35 is further configured to communicate the optical code data to an optical code decoder unit 90 of the optical code reader 30. The decoder unit 90 may reside on one or more processors, or may be embodied in one or more hardware constructs, that are housed within the optical code reader 30. Alternatively, the decoder unit 90 may be housed remotely from the optical code reader 30 and may receive the optical code data over a communication network (e.g., a wired network, a wireless network).

The decoder unit 90 includes multiple decoders that correspond to different types of optical codes. Such a decoder unit is sometimes referred to as an auto-discriminating decoder. For example, the decoder unit 90 may include any suitable type of one-dimensional and higher-dimensional code decoder. The decoder unit 90 may be configured to decode one or more of the following symbology types: UPC, codabar, code 25, code 39, code 93, code 128, codell, EAN2, EAN13, plessy, POSTNET, aztec code, maxicode, PDF417, QR code, high-capacity color barcode, and data matrix, to name a few. It should be recognized that many other symbology types exist, and the decoder unit 90 may be configured to decode one or more of these other symbology types.

The system 10 also includes an object recognition subsystem 100 that is configured to recognize the object 15 based on its appearance characteristics or other characteristics. In one embodiment, the object recognition subsystem 100 includes an image capture device 105 (e.g., still picture camera, video camera) that is configured to capture one or more images of the object 15. In one example, the image capture device 105 may be distinct and separate from the data acquisition subsystem 35 of the optical code reader 30. In another example, the image capture device 105 may be one and the same as the image capture device 70 of the data acquisition subsystem 35 of the optical code reader 30. In another example, image capture device 105 may be one of multiple image capture devices that are configured to capture images of the object 15 from different points of view to enable the object 15 to be recognized. The image capture device 105 may capture one or more images of the object 15 before or after the object 15 is in the read zone 37 of the optical code reader 30. In another example, the image capture device 105 may capture one or more images of the object 15 when the object 15 is in the read zone 37 of the optical code reader 30.

The image capture device 105 is configured to capture one or more images and produce image data that is communicated to a feature detector unit 110 of the object recognition system 100. The feature detector unit 110 is configured to analyze the image data (e.g., via a feature detector algorithm) to detect and extract visual features that are used to recognize the object 15. These detected visual features become part of a feature model of the object 15. Various types of visual features may be used to recognize the object 15. The visual features are geometric point features corresponding to points on the object 15 that are reliably detected and/or identified in an image of the object 15. The geometric point features may correspond to image locations that satisfy specific properties. For example, the feature detector unit 110 may include a Harris Corner Detector that detects locations in an image where edge boundaries intersect. These intersections typically correspond to locations where the packaging graphics create corners on the object 15. The term geometric point feature emphasizes that the features are defined at specific points in the image, and that the relative geometric relationship of features found in an image is useful for the object recognition process. The visual features of the object 15 may include a collection of information about the object 15 such as: an identifier to identify the object 15 or object model to which the feature belongs; the x and y position coordinates, scale and orientation of the visual feature; and a feature descriptor.

A feature descriptor (also referred to as descriptor, descriptor vector, feature vector, or local patch descriptor) is a quantified measure of some qualities of a detected feature used to identify and discriminate one feature from other features. Typically, the feature descriptor may take the form of a high-dimensional vector (feature vector) that is based on the pixel values of a patch of pixels around the feature location. Some feature descriptors are invariant to common image transformations, such as changes in scale, orientation, and illumination, so that the corresponding features of the object 15 observed in multiple images of the object 15 (that is, the same physical point on the object 15 detected in several images of the object 15 where image scale, orientation, and illumination vary) have similar (if not identical) feature descriptors.

Specific, non-limiting examples of features that may be used by object recognition system 100 include the following examples: scale-invariant feature transformation (SIFT) features described in U.S. Pat. No. 6,711,239; speeded up robust features (SURF), described in Herbert Bay et al., "SURF: Speeded Up Robust Features," Computer Vision and Image Understanding (CVIU), Vol. 110, No. 3, pp. 346-359 (2008); gradient location and orientation histogram (GLOH) features, described in Krystian Mikolajczyk & Cordelia Schmid, "A performance evaluation of local descriptors," IEEE Transactions on Pattern Analysis & Machine Intelligence, No. 10, Vol. 27, pp. 1615-1630 (2005); DAISY features, described in Engin Tola et al., "DAISY: An Efficient Dense Descriptor Applied to Wide Baseline Stereo," IEEE Transactions on Pattern Analysis and Machine Intelligence, (2009); and any other suitable features that encode the local appearance of the object 15, such as, features that produce similar results irrespective of how the image of the object was captured (e.g., variations in illumination, scale, position and orientation).

Figure 5:
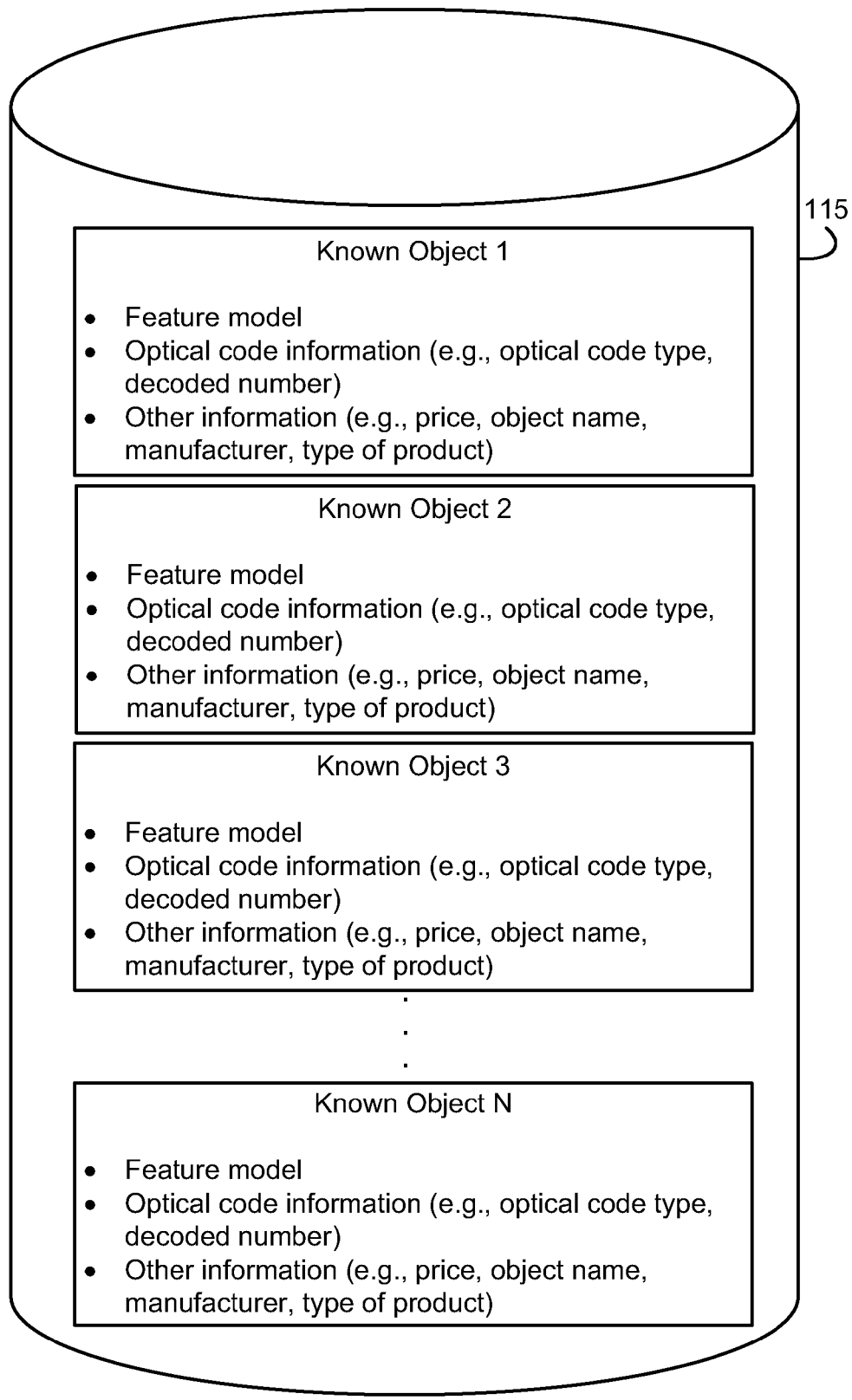
FIG. 5 is a diagram of a database and its contents that may be used in the object identification system of FIG. 1.

The object recognition system 100 also includes a database 115 that is configured to store information associated with known objects that one wants to recognize. FIG. 5 is a block diagram of the database 115 that shows representations of information associated with N known objects. The information may include a feature model for each of the N known objects. The feature models may be generated during a training process that is performed prior to attempting to recognize the object 15. The feature models include the type of visual features detected by feature detector unit 110. For example, the visual features of the known objects may include SIFT features, SURF, GLOH features, DAISY features, or any other suitable features that encode the local appearance of the known objects. The information associated with each known object also includes optical code information (e.g., the decoded number (e.g., UPC number), the optical code type (e.g., UPC, PDF417)) that corresponds to the known object. Other known object information, such as the known object's price, name, manufacturer, and product type, may also be stored in the database and associated with its corresponding known object.

The object recognition system 100 also includes a feature comparison unit 120 that is configured to receive the visual features of the object 15 that are identified by the feature detector unit 110. The feature comparison unit 120 is also configured to receive the visual features of the known objects that are stored in the database 115 and to compare the feature model of the object 15 to the feature models of the known objects to identify the known object to which the object 15 corresponds.

As provided in U.S. patent application Ser. No. 13/107,824, titled "Systems and Methods for Object Recognition Using a Large Database," which is hereby incorporated by reference in its entirety, the following is one non-limiting example of a process that the feature comparison unit 120 may use to recognize the object 15. Each visual feature of the object 15 and the known objects may include a corresponding feature vector that is based on the pixel values of a patch of pixels around the feature location in an image. The feature comparison unit 120 may identify a nearest-neighbor for a visual feature of the object 15 by computing the Euclidean distances between the visual feature's feature vector and the feature vectors of the known objects. The known object feature vector corresponding to the shortest Euclidean distance corresponds to the nearest-neighbor of the particular visual feature of the object 15. Once the nearest-neighbors in the database 115 are found for the visual features of the object 15, the nearest-neighbors may be used by the feature comparison unit 120 to vote for the known objects associated with the nearest-neighbors. If multiple known objects are identified as candidate matches for the object 15, the true known object match for the target object may be identified by determining which candidate match has the highest number of nearest-neighbor votes. One such known method of object recognition is described in U.S. Pat. No. 6,711,293, titled "Method and apparatus for identifying scale invariant features in an image and use of same for locating an object in an image." It should be recognized that other measures of similarity between feature models may be used to recognize the object 15.

The object recognition system 100 also includes a database filter unit 125 that is configured to receive data from the decoder unit 90 of the optical code reader 30. The database filter unit 125 is configured to use the data from the decoder unit 90 to improve the performance of the object recognition system 100 by reducing the search space of database information. For example, the database filter unit 125 is configured to identify a filter parameter, based on the data received from the decoder unit 90, that is used to obtain a subset of known objects that may correspond to (i.e., match) the object 15, or a subset of known objects that likely do not correspond to the object 15, as described in more detail below.

In some applications, the object recognition system 100 may be triggered in response to an unsuccessful decode of the optical code 20. In that situation, data corresponding to an attempted decode may be transmitted to the database filter unit 125 so that the data may be used to facilitate efficient searching of the feature models of the known objects in the database 115. In one embodiment, the data transmitted from the decoder unit 90 to database filter unit 125 correspond to partial decoded information that represents a decoded portion of the optical code 20. For example, although the decoder unit 90 may be unable to fully decode the optical code 20, the decoder unit 90 may be able to decode portions of the optical code 20 that convey information that may be useful in filtering out known object feature models in the object recognition process.

Figure 6:
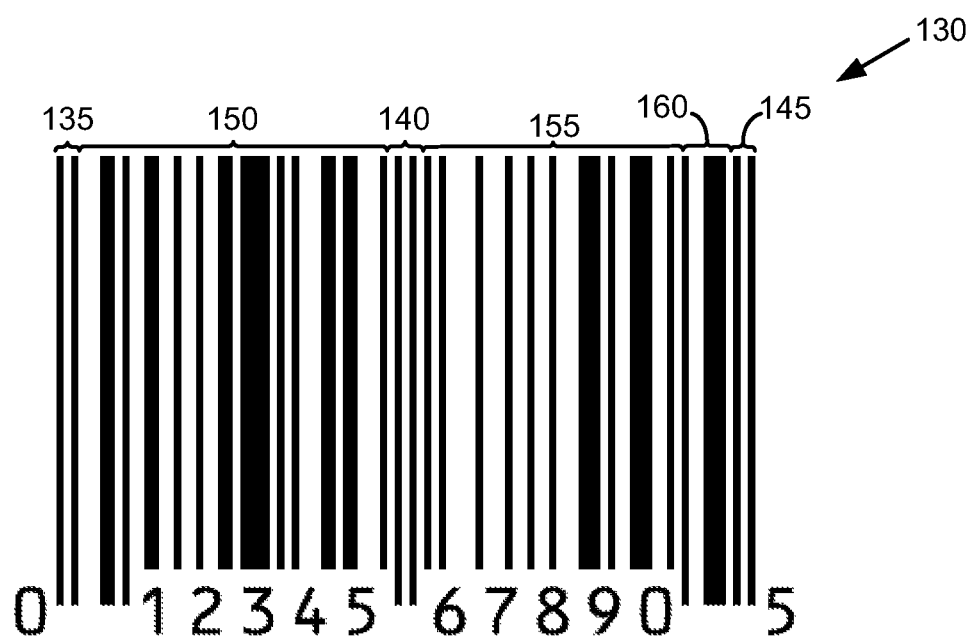
FIG. 6 is an image of an example UPC type optical code.

Various non-limiting examples of partial decoded information is described with reference to FIG. 6, which is a representation of a UPC code 130. The UPC code 130 includes various portions that identify the code's type and/or convey certain information to a point of sale (POS) system. For example, the UPC code 130 includes start guard bars 135 (i.e., bar-space-bar or 101), middle guard bars 140 (i.e., space-bar-space-bar-space or 01010), and end guard bars 145 (i.e., bar-space-bar or 101) that may be used in conjunction with the quantity and widths of the bars and spaces in the characters 150, 155 and 160 to identify the code 130 as a UPC type code. The guard bars 135, 140, and 145 also establish timing for reading the code. A typical UPC code 130 also includes a manufacturer identification number (a.k.a. a manufacturer code) 150 that identifies the manufacturer of the object 15. The manufacturer identification number 150 in this example is "012345." The first digit in the manufacturer identification number 150 may be a number system character 155 (a.k.a. a prefix) that keys the category (e.g., general items, random weight items such as produce, drug and health related items, coupons) related to the object 15. The UPC code 130 may also include an item number 155 (a.k.a. a product code) that identifies the object bearing the UPC code 130. The item number 155 in this example is "67890." The UPC code 130 also includes a check digit 160, which in this example is "5," that is computed using the manufacturer identification number 150 and the item number 155. The check digit 160 may be used to detect an error in the physical print of the UPC code 130 or in the reading of it. It should be understood that other code types may encode other types of information.

In an attempt to decode the UPC code 130, the decoder unit 90 may decode one or more portions of the UPC code 130 without decoding it in its entirety. For example, the decoder unit 90 may be able to decode the start guard bars 135, middle guard bars 140, and/or the end guard bars 145 without decoding the other portions of the UPC code 130. The decoder unit 90 may use the decoded guard bar portion(s) 135, 140, and/or 145 to identify the code 130 as a UPC type code and communicate the code type to the database filter unit 125 to enable it to filter out the object models of known objects that do not have a corresponding UPC code type (e.g., filter out known objects that do not bear a UPC code). The database filter unit 125 may then retrieve only the feature models of known objects that have a corresponding UPC code type and supply those feature models to the comparison unit 120. Accordingly, the database filter unit 125, together with partial decoded data from the optical code reader 30, may enable the object recognition system 100 to search through a subset, instead of the entire set, of the feature models in the database 115 for a match for the object 15. In another example, the decoder unit 90 may be able to decode the manufacturer identification number 150 without decoding the item number 155. In that situation, the decoder unit 90 may communicate the manufacturer identification number 150 to the database filter unit 125 to thereby enable it to retrieve only the feature models corresponding to known objects associated with the manufacturer identification number 150. In another example, the decoder unit 90 may be able to decode the item number 155 without decoding the manufacturer identification number 150. Accordingly, the decoder unit 90 may communicate the item number 155 to the database filter unit 125 to thereby enable it to retrieve only the feature models corresponding to known objects that have the item number 155. In another example, the decoder unit 90 may be able to decode the check digit 160 without decoding the manufacturer identification number 150 and the item number 155. The decoder unit 90 may communicate the check digit 160 to the database filter unit 125 to thereby enable it to retrieve only the feature models that have the corresponding check digit 160.

There are several means that can be used for identifying data that matches partially decodable optical code data. For example, data stored in a database (such as the PostgreSQL database) may be selected using the Structured Query Language (SQL) by executing query commands that match inputs to database data entries using the SQL LIKE operator, the SQL-99 SIMILAR TO operator, regular expression matching, or other suitable operators. In one embodiment, for example, barcode data may be represented in the database as a string that is fifteen characters in length, including an L character to represent the leading guard pattern 135, a C character to represent the center guard pattern 140, a T character to represent the trailing guard pattern 145, and the numeric characters 0 through 9 to represent the other encoded data and check characters 150, 155, and 160. Accordingly, a barcode reader may then read or scan a barcode fragment including a substring containing the digits 8905 and a trailing guard pattern T. Next, the SQL operation V LIKE '%8905T' may then be used to locate a database value V for possible matches of the indentified information. In this example, the percent symbol matches zero or more characters of any alphanumeric character data. Consequently, this example will match any string in the database that ends with the string of characters 8905T. In another example, the barcode reader may find a UPC code that is substantially decodable except for several characters that may be undecodable due to various reasons (e.g., smudging, lighting conditions, or other reasons). The decodable information in this example may be represented by the string L01_45C678905T, where the underscore characters represent unknown (i.e., undecodable) wildcard characters in the barcode. A database query such as for example, SQL operation V LIKE 'L01_45C678905T' locates values V, in which the underscore characters match any alphanumeric characters in those fourth and fifth string positions and the other alphanumeric characters must be an exact match having corresponding string positions. The syntax used with a specific database implementation may differ from that shown in these examples, but the matching and filtering operations follow similar principles described above.

Figures 7, 8:
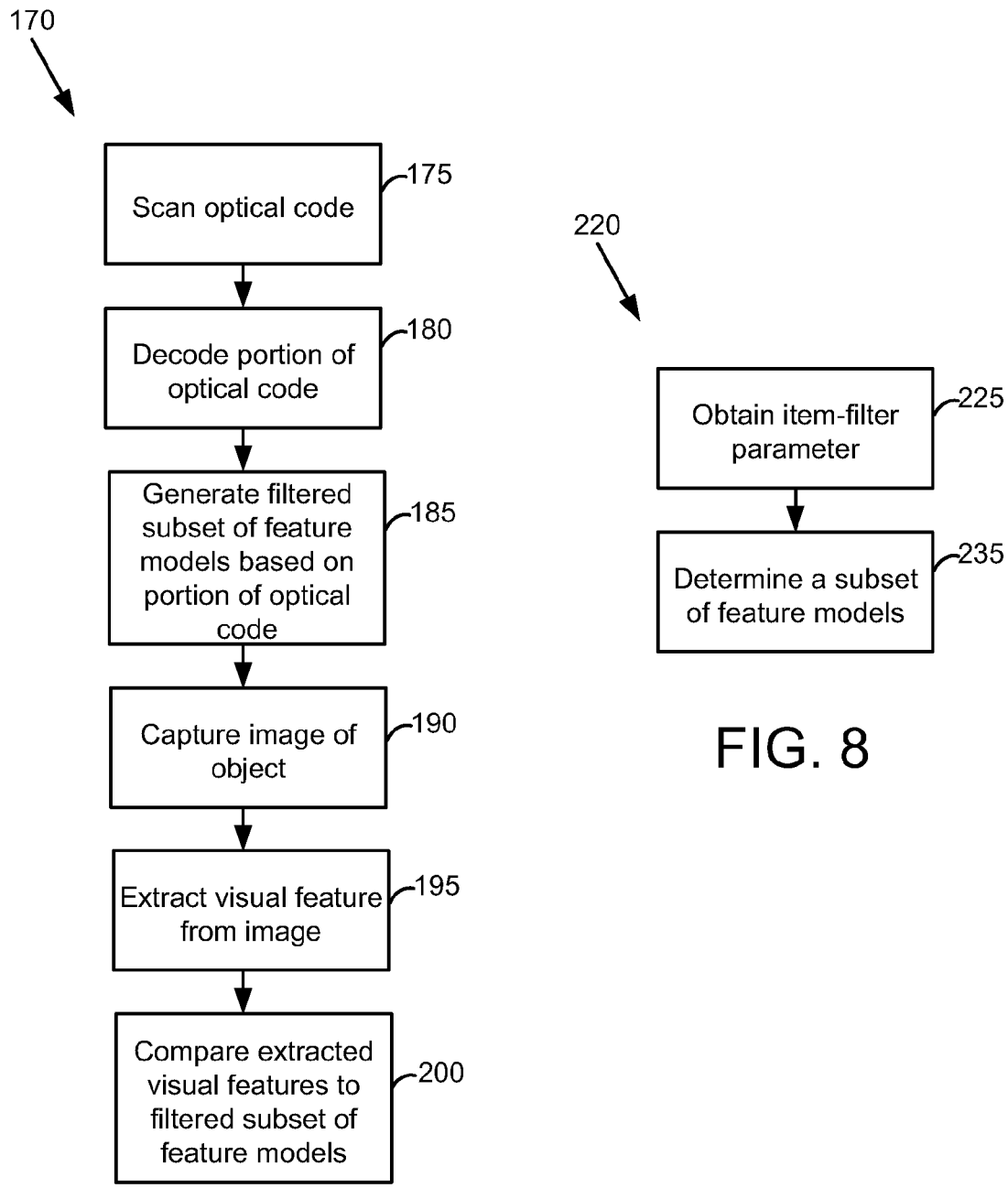
FIG. 7 is a flowchart of one example method for identifying an object using the object identification system of FIG. 1.
FIG. 8 is a flowchart of one example method for reducing a search space of a database including feature models used in visual object recognition.

FIG. 7 is a flowchart of one method 170 that may be used in connection with the system 10 to identify the object 15. The optical code reader 30 scans the optical code 20 to attempt to decode it and identify the object 15 (step 175). The decoder unit 90 decodes a portion of the optical code 20, but not all of it (step 180). The optical code reader 30 communicates data representing the decoded portion of the optical code 20 to the database filter unit 125, and the database filter unit 125 generates a filtered subset of feature models from the set of features stored in the database based on the decoded portion of the optical code 20 (step 185). For example, if the decoded portion of the optical code 20 corresponds to a check digit, the database filter unit 125 retrieves from the database 115 only those feature models that correspond to known objects having that check digit in their optical code information. The image capture device 105 of the object recognition system 100 (e.g., image capture device 70, or a distinct unit as described above) captures an image of the object 15 (step 190). The feature detector unit 110 extracts visual features from the image captured by the image capture device 105 (step 195). The comparison unit 120 receives the extracted features from the feature detector unit 110 and the filtered subset of feature models from the database filter unit 125. The comparison unit 120 compares the extracted features to the feature models of the filtered subset of feature models to find one or more matches (step 200).

In response to the decoder unit 90 decoding only the portion of the optical code 20 at step 180, the image capture device 105 may be triggered to capture the image at step 190 and the feature detector unit 110 may be triggered to extract the visual features from the image. In some embodiments, the image capture device 105 may capture the image at step 190 (and the visual features may be extracted from the image) before or during scanning of the optical code 20 with the optical code reader 30. Accordingly, operation of the image capture device 105 and the feature detector unit 110 need not be triggered by the decoding outcome of the optical code reader 30. Thus, in some embodiments, the image from step 190 may also be used for reading the optical code at step 175, while the feature detector unit 110 may extract visual features from the same image.

FIG. 8 is a flowchart of one method 220 that may be used in connection with the system 10 to reduce a search space of the database 115 including feature models used in visual object recognition. Step 225 includes obtaining an item-filter parameter corresponding to incomplete information (e.g., optical code fragment information) encoded in an optical code of an unknown item. For example, the item-filter parameter may be the decoded portion of the optical code 20 that corresponds the check digit 160 (FIG. 5) or other types of incomplete information encoded in the optical code 20 of the unknown item 15. Step 235 includes determining a subset of feature models based on the item-filter parameter, wherein feature models of the subset correspond to a known item having known optical code information that includes the incomplete information encoded in the optical code 20, for example. In one embodiment, the database filter unit 125 reduces the database search space by querying and obtaining from the database 115 only those feature models that correspond to known objects having a check digit value in their optical code information that is the same as that of the item-filter parameter.

As used herein, the term unit is a component that may comprise one or more hardware circuits or devices and/or one or more software routines, functions, object or the like. A unit may be entirely hardware, entirely software, comprise firmware, or comprise some combination of the foregoing. As used herein, the term system refers to a tangible object or group of objects, or a combination of functional components.

The methods, units, and systems illustrated and described herein can exist in a variety of forms both active and inactive. For example, they can exist partly or wholly as one or more software programs comprised of program instructions in source code, object code, executable code or other formats. Any of the above can be embodied in compressed or uncompressed form on computer-readable medium.

The terms and descriptions used above are set forth by way of illustration only and are not meant as limitations. It will be understood by skilled persons that many changes may be made to the details of the above-described embodiments without departing from the underlying principles of the invention. The scope of the present invention should, therefore, be determined only by the following claims.

The invention claimed is:

1. A method of identifying an object by use of a system that includes a database of feature models of known objects having known optical code information associated therewith, the feature models including visual features that are geometric point features corresponding to points on the known objects, the method comprising:

attempting to read an optical code on an object, the optical code encoding a set of characters;

decoding a portion of the optical code to obtain an item-filter parameter comprising incomplete information encoded in the optical code, the incomplete information corresponding to a decoded subset of the set of characters encoded in the optical code, the decoded subset including at least one member and fewer than all members of the set of characters;

when the item-filter parameter is obtained, generating a filtered subset of feature models from the database of feature models based on the item-filter parameter, each feature model of the filtered subset of feature models corresponding to a known object whose associated known optical code information includes the decoded subset;

capturing an image that includes a representation of the object, wherein the object is a physical item;

extracting visual features from the image, the extracted visual features being geometric point features corresponding to points on the object; and comparing the extracted visual features to those of the feature models of the filtered subset of feature models to identify a match between the object and a known object.

2. The method of claim 1, further comprising:

detecting an exception event in response to the decoding yielding fewer than all of the members of the set of characters encoded in the optical code; and generating the filtered subset of feature models in response to detecting the exception event.

3. The method of claim 1, wherein the decoded subset includes a check digit, and wherein each feature model of the filtered subset of feature models includes a known check digit equal to that of the decoded subset.

4. The method of claim 1, wherein the decoded subset includes a manufacturer identification, and wherein each feature model of the filtered subset of feature models includes a known manufacturer identification equal to that of the decoded subset.

5. The method of claim 1, wherein attempting to read the optical code on the object comprises reading a representation of the optical code from the image.

6. The method of claim 1, wherein the geometric point features are scale-invariant feature transform (SIFT) features.

7. The method of claim 1, wherein the geometric point features include multiple scale-invariant features defining a spatial relationship between the geometric point features.

8. The method of claim 1, wherein the decoded subset corresponds to information available in a fragment of the optical code.

9. The method of claim 1, wherein the object is an object of merchandise in a retail store.

10. An object identification system, comprising:
- an optical code reader configured to decode a portion of an optical code on an object, and obtain from it an item-filter parameter comprising incomplete information encoded in the optical code, the incomplete information corresponding to a decoded subset of a set of characters encoded in the optical code, the decoded subset including at least one member and fewer than all members of the set of characters;
- an image capture device configured to capture an image of the object, wherein the object is a physical item;
- a feature detector unit configured to detect visual features in the image captured by the image capture device, the visual features detected in the image comprising geometric point features corresponding to points on the object;
- a database configured to store feature models of known objects having known optical code information associated therewith, the feature models including visual features comprising geometric point features corresponding to points on the known objects;
- a database filter unit in communication with the optical code reader and the database, the database filter unit configured to, when the item-filter parameter is obtained, generate a filtered subset of feature models based on the item-filter parameter; and
- a comparison unit in communication with the feature detector unit and the database filter unit, the comparison unit configured to compare the detected visual features and the feature models of the filtered subset of feature models to identify a match between the object and a known object.

11. The object identification system of claim 10, wherein the feature detector unit, the database filter unit, and the comparison unit are implemented in a processor.

12. The object identification system of claim 10, wherein the optical code reader includes the image capture device.

13. The object identification system of claim 10, wherein the database is configured to store the known optical code information associated with the known objects.

14. The object identification system of claim 10, wherein the optical code reader is further configured to generate an exception event indicating that the optical code reader is unable to decode all of the optical code, and the database filter unit is further configured to generate the filtered subset of feature models in response to the exception event.

15. The object identification system of claim 10, wherein the database filter unit is configured to generate the filtered subset of feature models by identifying feature models in the database that correspond to known objects whose associated known optical code information includes the decoded subset.

16. The object identification system of claim 10, wherein the geometric point features are scale-invariant feature transform (SIFT) features.

17. The object identification system of claim 10, wherein the geometric point features include multiple scale-invariant features that define a spatial relationship between the geometric point features.

18. The object identification system of claim 10, wherein the decoded subset corresponds to information available in a fragment of the optical code.

* * * * *